US 8,416,299 B2

(12) United States Patent
Moore

(10) Patent No.: US 8,416,299 B2
(45) Date of Patent: Apr. 9, 2013

(54) DIRECTIONAL SURVEILLANCE CAMERA WITH RING OF DIRECTIONAL DETECTORS

(75) Inventor: Daniel John Moore, Hamilton (AU)

(73) Assignee: Lextar Pty Ltd., Queensland (AU)

( * ) Notice: Subject to any disclaimer, the term of this patent is extended or adjusted under 35 U.S.C. 154(b) by 0 days.

(21) Appl. No.: 11/922,658

(22) PCT Filed: Jun. 20, 2006

(86) PCT No.: PCT/AU2006/000860
§ 371 (c)(1),
(2), (4) Date: Aug. 4, 2009

(87) PCT Pub. No.: WO2006/135962
PCT Pub. Date: Dec. 28, 2006

(65) Prior Publication Data
US 2009/0295923 A1    Dec. 3, 2009

(30) Foreign Application Priority Data
Jun. 20, 2005   (AU) ................................. 2005903226

(51) Int. Cl.
H04N 7/18      (2006.01)
H04N 5/33      (2006.01)
G01S 15/89     (2006.01)
(52) U.S. Cl. .......................... 348/152; 348/163; 348/164
(58) Field of Classification Search .................. 348/152, 348/154, 163–164
See application file for complete search history.

(56) References Cited

U.S. PATENT DOCUMENTS

| 4,857,912 | A |   | 8/1989  | Everett, Jr. et al.           |
| 5,473,368 | A | * | 12/1995 | Hart .................. 348/155 |
| 5,581,297 | A |   | 12/1996 | Koz et al.                     |
| 5,909,548 | A | * | 6/1999  | Klein et al. ........... 709/217 |
| 6,069,655 | A |   | 5/2000  | Seeley et al.                  |
| 6,504,479 | B1 |  | 1/2003  | Lemons et al.                  |
| 2001/0010542 | A1 | * | 8/2001  | Takagi et al. ......... 348/152 |
| 2004/0032494 | A1 | * | 2/2004  | Ito et al. ............ 348/152 |
| 2005/0018879 | A1 | * | 1/2005  | Ito et al. ............ 382/103 |
| 2006/0171453 | A1 | * | 8/2006  | Rohlfing et al. ..... 375/240.01 |
| 2006/0181402 | A1 | * | 8/2006  | Martin et al. ......... 340/506 |
| 2007/0180124 | A1 | * | 8/2007  | Mallesan et al. ....... 709/227 |
| 2011/0058036 | A1 | * | 3/2011  | Metzger et al. ....... 348/143 |

FOREIGN PATENT DOCUMENTS

| EP | 984632   | 3/2000  |
| WO | 98/43424 | 10/1998 |

* cited by examiner

*Primary Examiner* — Patrice Winder
*Assistant Examiner* — Ebrahim Golabbakhsh
(74) *Attorney, Agent, or Firm* — Dilworth & Barrese, LLP.

(57) ABSTRACT

A motion detector consisting of multiple motion detector elements each having a preset field of view. An alarm signal generated by a motion detector element when movement is detected is sent to a detector controller which converts the alarm signal to a control signal for an associated camera to direct the field of view of the camera to match the preset field of view of the motion detector element that generated the alarm.

18 Claims, 8 Drawing Sheets

DIRECTIONAL SURVEILLANCE CAMERA WITH RING OF DIRECTIONAL DETECTORS

The invention relates to a detector ring for a surveillance camera. In particular it relates to a ring of motion detector elements providing movement detection in zones surrounding pan/tilt cameras, dome cameras and the like.

BACKGROUND TO THE INVENTION

Various camera-based surveillance systems are well known and used in a variety of applications for security purposes. At the base level these include fixed cameras that have a pre-set field of view. The field of view of these cameras can be extended by introducing a pan facility so that the camera scans across a given field of view at a predetermined rate. More sophisticated surveillance systems have cameras that can be remotely controlled to adjust pan, tilt and zoom. Typically these cameras are part of a monitored network.

In a monitored network a surveillance operator sits at a central console and continuously views monitors displaying images from each camera in the network. When a suspicious activity is sighted the operator controls the camera to pan, tilt and zoom to obtain the best available view of the suspicious activity. In large networks of cameras the effectiveness of surveillance can be limited by the skill and capacity of the operator.

Whether standalone or part of a network, the cameras have a limited field of view. It is impossible for an operator to detect and react to activity outside of the field of view of the camera. Even if the camera is set to scan there will still be times when surveillance areas are not visible to an operator. The only way to provide total surveillance is to have an extensive network of cameras with carefully interlocked fields of view. This places an even greater load on the operator charged with monitoring the cameras.

In our international application, PCT/AU2006/000113, we describe a controller incorporating two joysticks to assist operators to control multiple cameras. Notwithstanding the significant improvement available with the use of our innovative controller, surveillance capacity is still often limited by the operator.

Large surveillance tasks usually require a large number of cameras to provide extensive coverage. A large number of cameras places a load on the operator, as mentioned above, but also involves a significant installation cost. We have previously described a track mounted camera for a surveillance system that reduces the number of cameras required to achieve broad surveillance. This is described in our earlier applications, for example Australian patent number 762221 for "A Surveillance System". Nonetheless, the problem of monitoring and controlling multiple track mounted cameras may still become intractable.

Even with the improvements we have provided it is still difficult for an operator to maintain constant surveillance of a large area, yet in many locations such as grocery stores and gaming establishments, this is exactly what is required. The only solution available is to employ additional staff and to break the surveillance area into zones. This approach is costly in wages and causes handover difficulties if zones are adjacent.

OBJECT OF THE INVENTION

It is an object of the present invention to provide a detector ring for a camera of a surveillance system.

Further objects will be evident from the following description.

DISCLOSURE OF THE INVENTION

In one form, although it need not be the only or indeed the broadest form, the invention resides in a motion detector associated with a surveillance camera, the motion detector comprising:
a plurality of motion detector elements, each motion detector element
having a preset field of view;
a detector controller;
means for communicating an alarm signal from each motion detector element to the detector controller when the motion detector element detects movement in the preset field of view; and
means for communicating a control signal from the detector controller to the camera, the control signal causing the camera to do one or more of pan, tilt, zoom and travel to a field of view corresponding to the field of view of the motion detector element causing the alarm signal.

In a further form the invention resides in a network of multiple motion detectors each associated with one or more cameras wherein detection of movement by at least one of the motion detectors causes one or more of the cameras to do at least one of pan, tilt, zoom and travel to view the movement.

BRIEF DETAILS OF THE DRAWINGS

To assist in understanding the invention preferred embodiments will now be described with reference to the following figures in which.

DETAILED DESCRIPTION OF THE DRAWINGS

Figure 1:
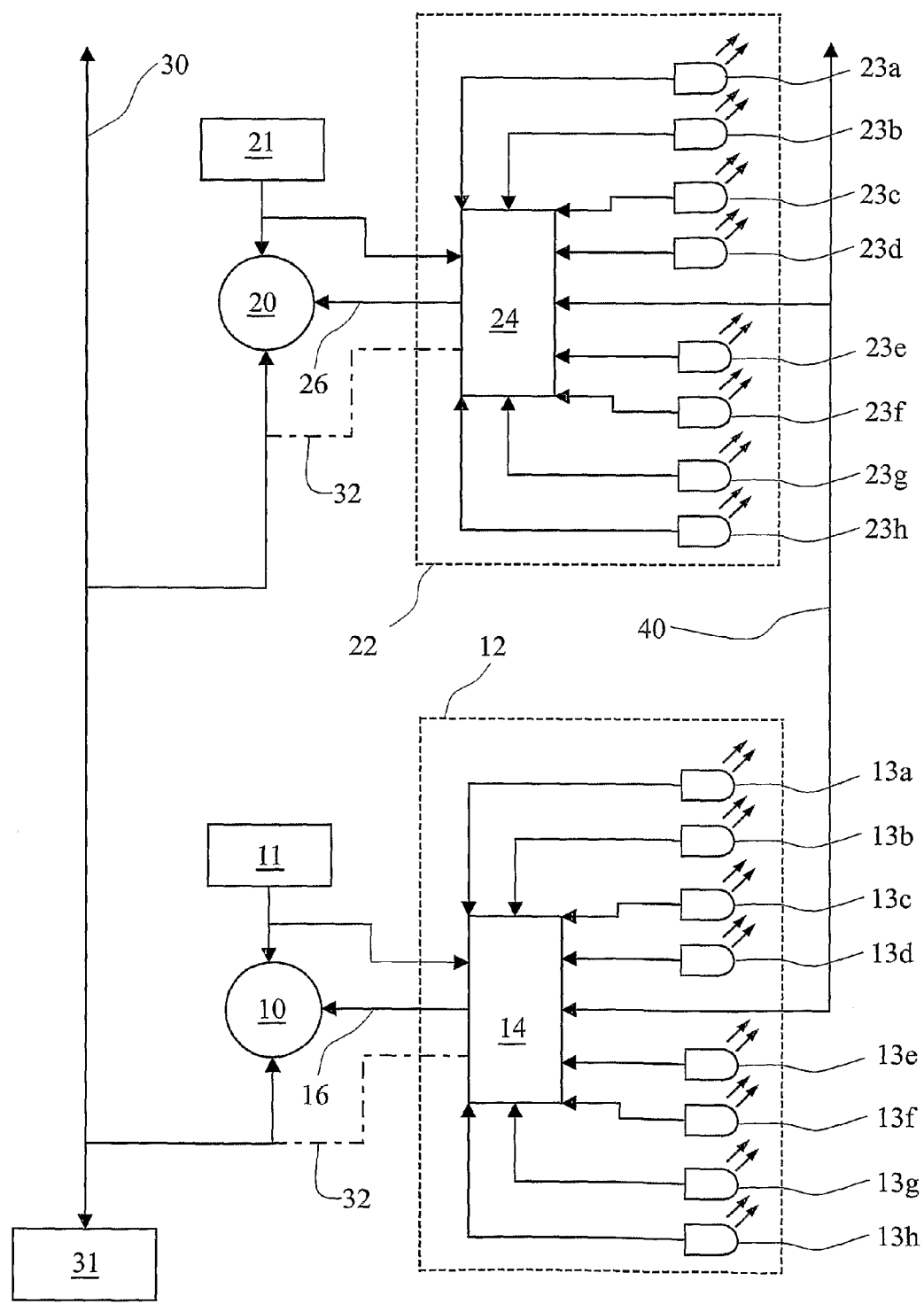
FIG. 1 shows a block schematic diagram of two detector rings applied to two cameras in a small network.

In describing different embodiments of the present invention common reference numerals are used to describe like features.

Referring to FIG. 1, there is shown a first camera 10 with associated power supply 11 and a second camera 20 and associated power supply 21. The first camera 10 and second camera 20 are connected to a controller bus 30 driven by a network controller 31, such as known CCTV controllers or the controller described in our patent application mentioned above.

A first motion detector 12 is associated with the first camera 10 and a second motion detector 22 is associated with the second camera 20. Each motion detector 12, 22 may draw power from the camera power supplies 11, 21 as shown. Alternately each motion detector 12, 22 may have an integral power supply (not shown).

Looking particularly at first motion detector 12, it can be seen that in the particular embodiment shown there are eight detector elements 13a-h each connected to a detector controller 14. The detector controller 14 receives alarm signals from the detector elements 13 and generates a control signal 16 to the camera 10. The detector elements 13 are suitably passive infrared devices or microwave devices. Other movement detection technology, such as active infrared and ultrasonic will also be suitable.

Each detector controller 14, 24 is connected on a detector network 33, for centralized programming, control and monitoring, as described in greater detail below. Each detector controller 14, 24 may also be connected to the network controller 31 if suitable interface ports 32 are available.

Only two motion detectors 12, 22 are shown in FIG. 1 but persons skilled in the art will understand that the network of detectors can easily be extended. The inventors envisage that maximum benefit is obtained when there is a motion detector associated with each camera in a static surveillance system and at least each track in a track mounted system.

In one preferred embodiment the motion detector 12, 22 is configured as a ring around the camera 10, 20 as shown in FIG. 2. An exploded view of the first camera 10 is shown in FIG. 2a. A printed circuit board 15 is fitted above the ring of detectors 12 and contains all necessary electronics for powering the detectors, controlling the detectors and receiving signals from the detectors. The printed circuit board 15 also includes the communication electronics for transmitting the signals to the camera 10.

It is convenient for the printed circuit board 15 to include an on-board microprocessor which manages network priorities, sensor ranges, sensor directions and communication protocols. However, these functions could be performed by discrete elements.

Figure 2A:
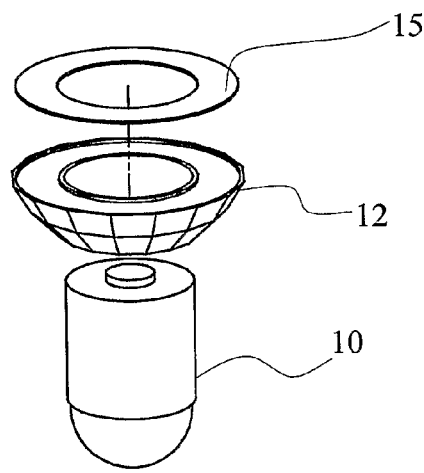
FIG. 2 is a sketch of a detector ring fitted to a dome camera including an exploded view (FIG. 2a), a perspective view (FIG. 2b), a flush mount view (FIG. 2c) and a surface mount view (FIG. 2d)
Figure 2B:
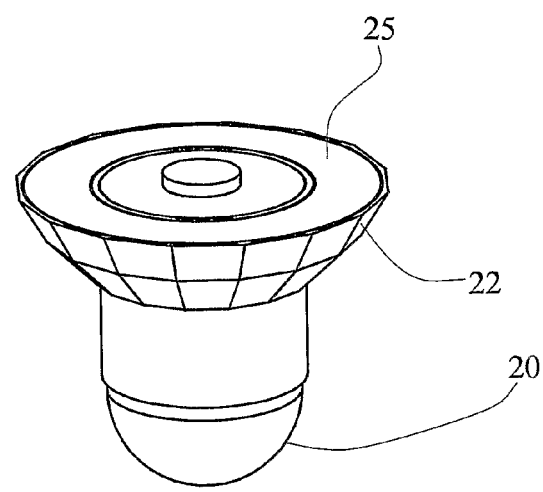
Figure 2C:
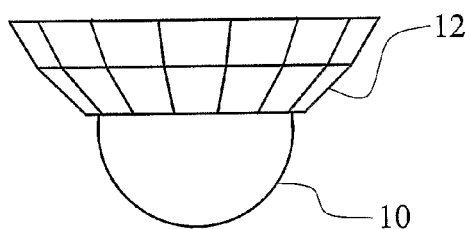
Figure 2D:
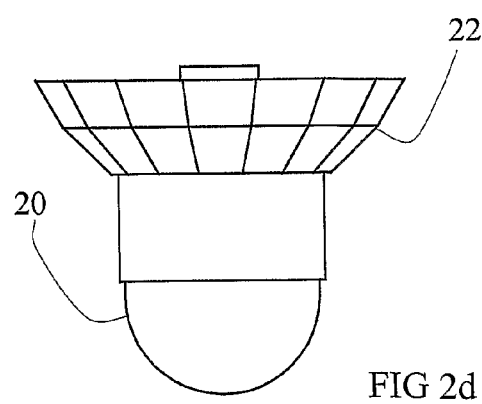

If the camera 10 is a flush mounted dome camera as shown in FIG. 2c the detector ring 12 will be low on the body of the camera 10. If the camera 20 is a surface mounted dome camera as shown in FIGS. 2c and 2d, the motion detector 22 will be mounted higher, but the printed circuit board 25 will still be above the detectors for convenience.

Figure 3:
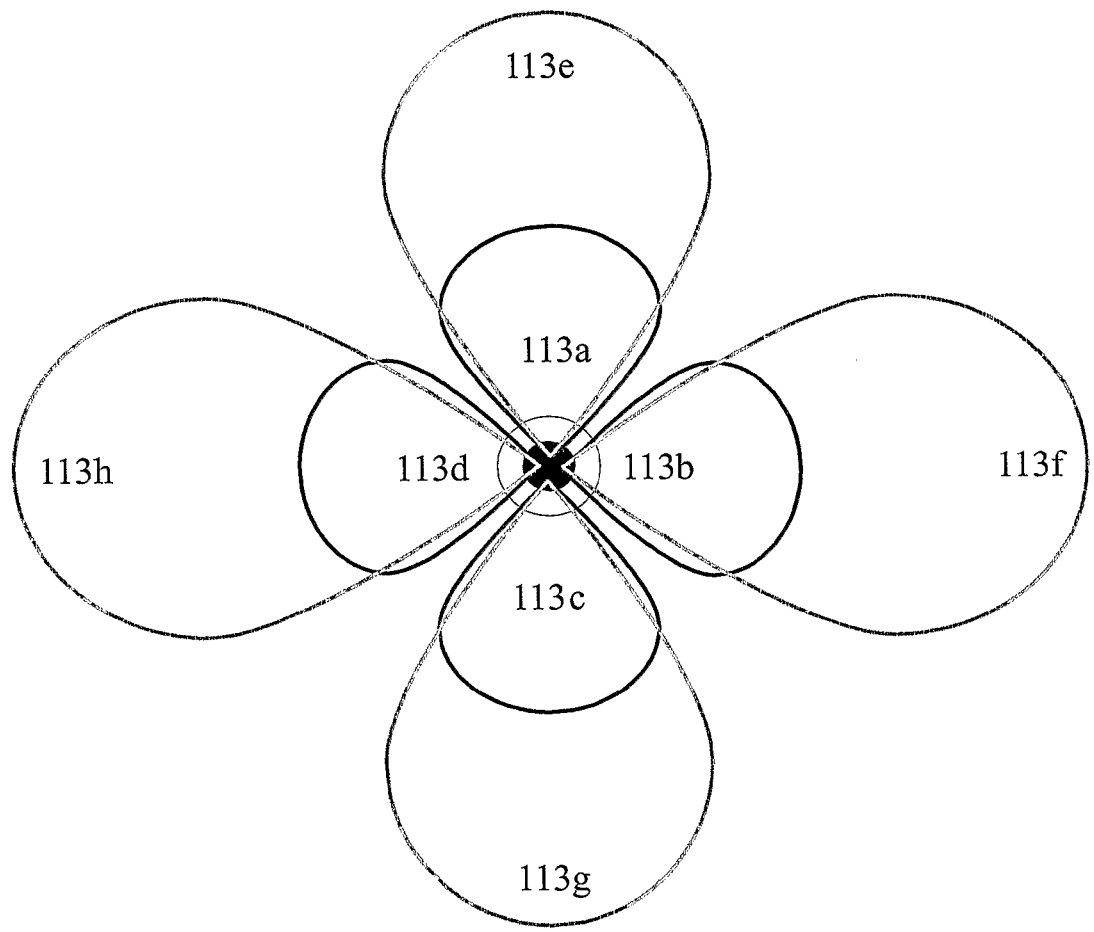
FIG. 3 depicts one embodiment of detection zones associated with a detector ring.

Each detector element 13, 23 may be configured to detect motion in a particular zone. An example of one layout of detector element zones is shown in FIG. 3. In this layout the detectors are arranged in pairs with a short range and a long range detector in each pair to form four short range movement detection zones 113a-d and four long range movement detection zones 113e-h. The zones are conveniently set out on a north/south/east/west pattern.

In operation a movement detected in a particular zone generates an alarm signal to the detector controller 14, 24 which sends a control signal 16, 26 to the camera 10, 20. Typical cameras have control inputs or alarm inputs. In the simplest form there will be the same number of alarm inputs to the camera as there are detector elements. Each alarm input is pre-programmed to a camera preset so that an alarm on a particular alarm input will cause the camera to pan/tilt/zoom to the corresponding zone.

Figure 4:
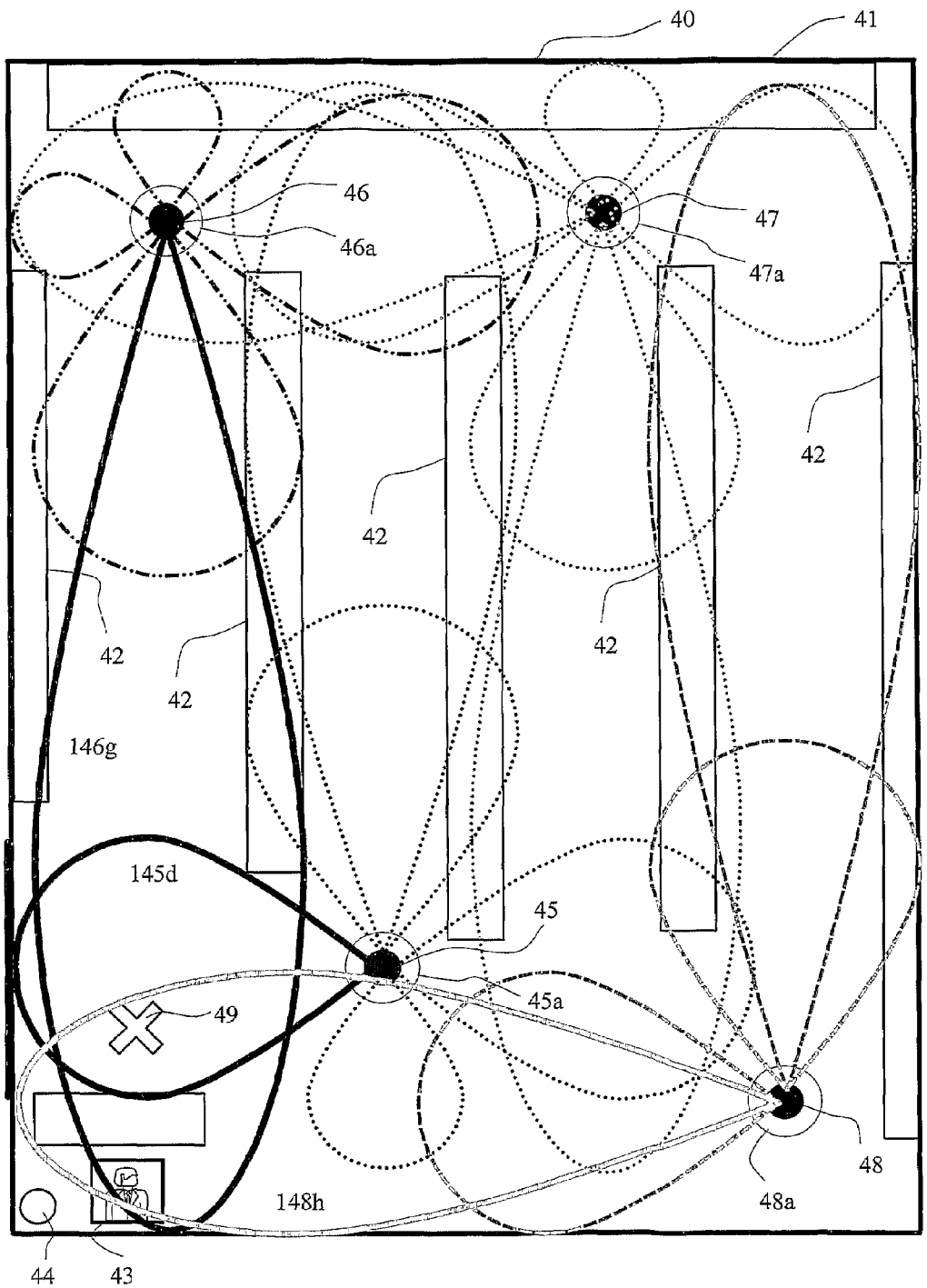
FIG. 4 shows one embodiment of a layout of cameras and detector rings in a grocery store environment.

In practice, the geography of an area under surveillance will not lend itself to the simple field-of-view arrangement depicted in FIG. 3. A more realistic environment is a small grocery store 40 such as depicted in FIG. 4. The store 40 has a large shelf 41 along a rear wall and a number of shelves 42 forming aisles. A shop assistant 43 watches a monitor 44 which displays scenes from security cameras 45-48. In prior art systems the cameras would be set to scan from side to side or the operator would need to periodically select from a number of available fields-of-view. This is particularly difficult for the operator, especially when they have other tasks as well.

A network of four cameras 45-48 and four associated detectors 45a-48a provide complete field-of-view coverage of the store 40 by detecting movement in a field-of-view of at least one of the detectors and directing the camera field-of-view to the detector field-of-view. For instance, in FIG. 4, a target 49 enters the store. Detector elements 45a, 46a and 48a detect movement in zones 145d, 146g and 148h respectively.

It will be noted that each camera 45-48 has a different configuration of detection zones. For instance, camera 45 has four near-field zones 145a-d, although zone 145c is truncated by a wall, and one far-field zone 145e. In FIGS. 4-7 the active detector zones are shown as full lines and the inactive zones are shown as dotted lines.

Figure 5:
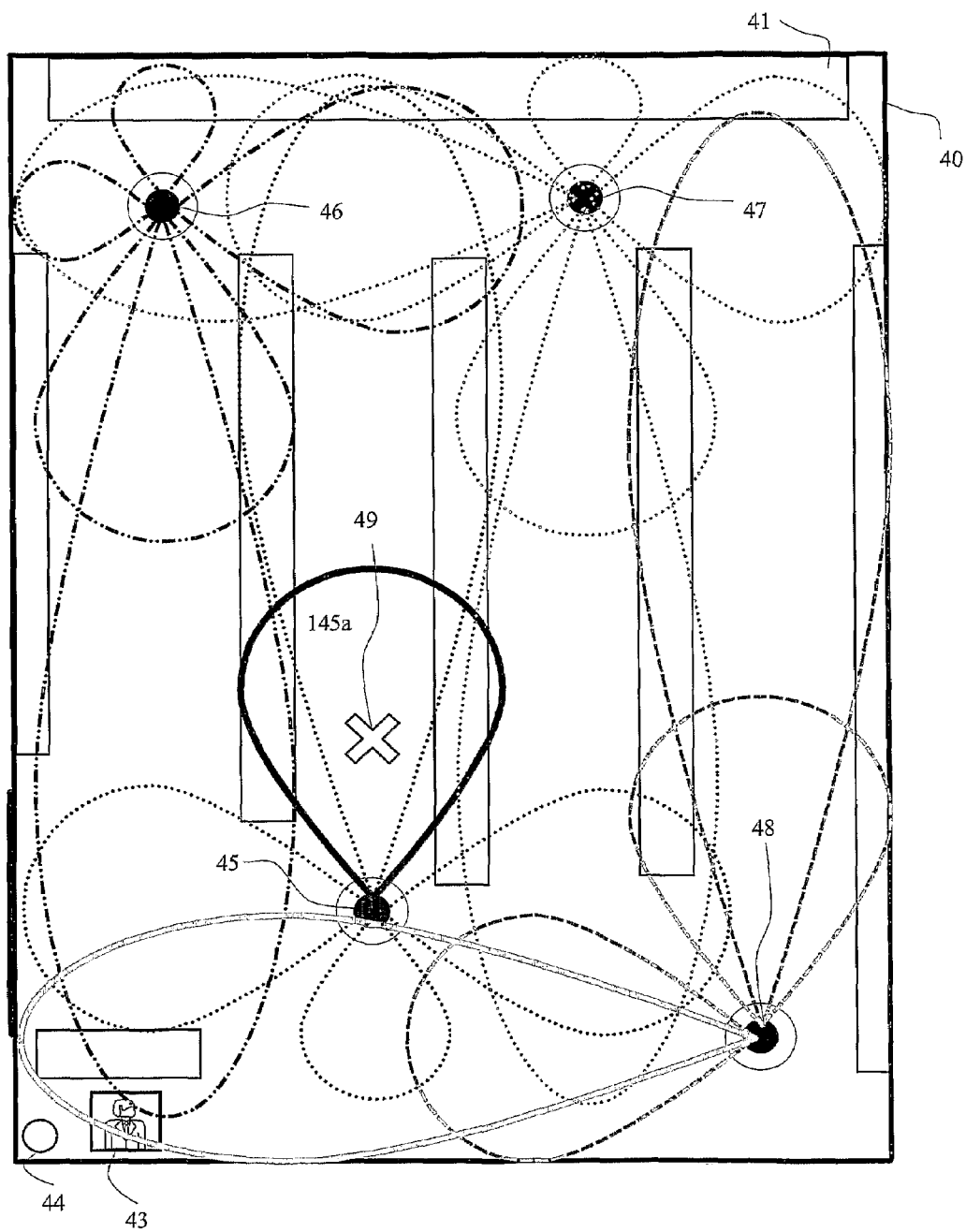
FIG. 5 shows the actions as a target moves through the grocery store environment of FIG. 4.

As the target 49 moves through the store 40, as shown in FIG. 5, the detector elements of each motion detector detect movement in different zones. It can be seen in FIG. 5 that target 49 has moved and detector zone 145a, is the only active zone. However, as the target 49 moves to the position shown in FIG. 6 the active zone changes to 145e.

Figure 6:
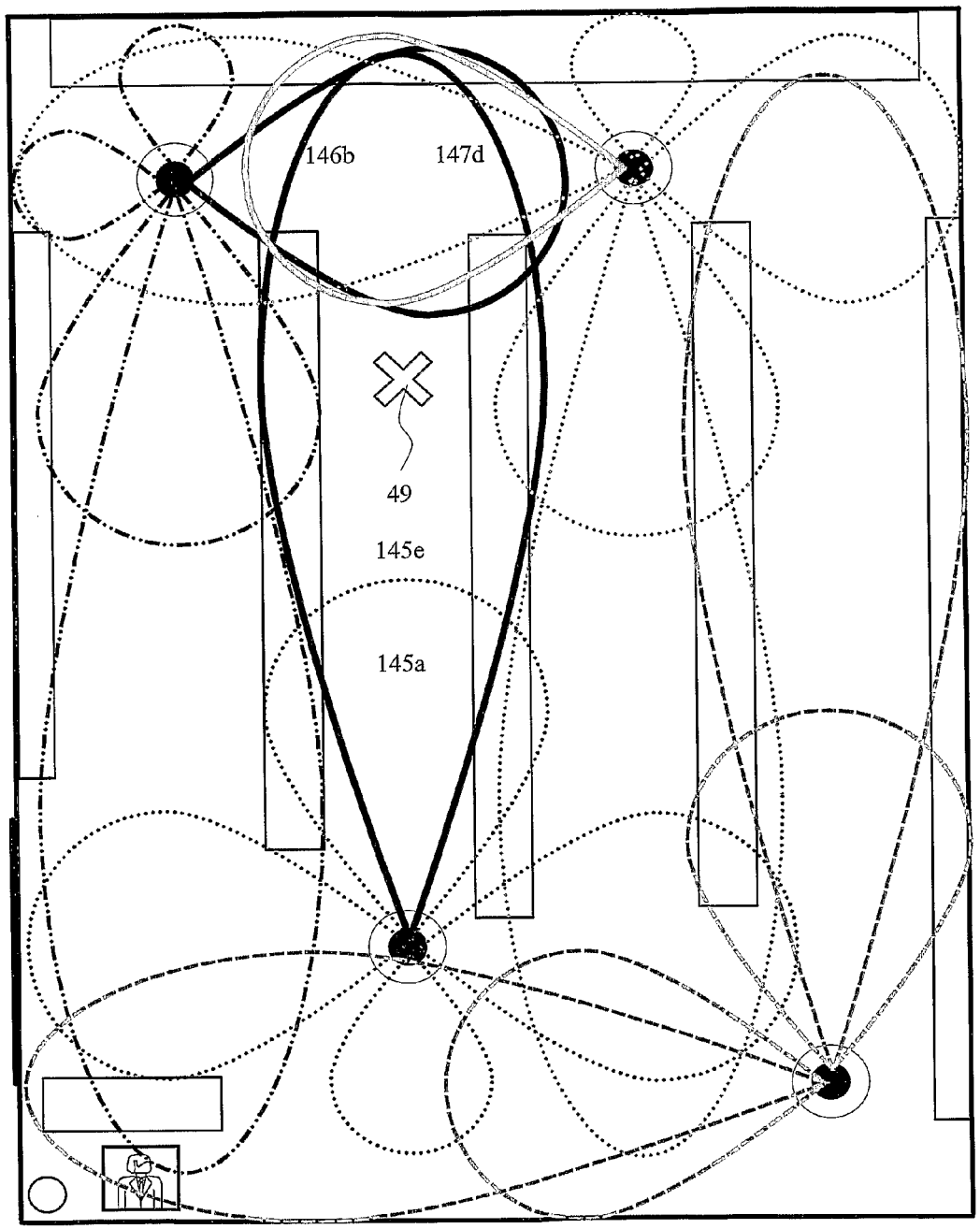
FIG. 6 shows the further actions as a target moves through the grocery store environment of FIG. 4.

When the detectors 45a-48a are networked they may be configured to anticipate movement so that zones become active and the field-of-view of relevant cameras are adjusted in anticipation of the movement of target 49. This is shown in FIG. 6 where zones 146b and 147d are activated in anticipation of the movement of target 49 along the aisle. The cameras 46, 47 associated with detectors 46a and 47a are positioned to view the area at the end of the aisle so that the operator 43 can watch the movement of the target 49 on the monitor 44 and also have the next relevant view cued on a second monitor or split screen. This may be controlled by software in the network controller 31.

The example of FIGS. 4-6 is a simple example of the operation of a small network of motion detectors each with up to eight elements and associated with a network of an equal number of cameras. Even in the simple network it will be appreciated that there may be times when there are multiple targets in different views of the same camera. As explained above, there is particular advantage if the motion detectors and cameras are connected in a network with a network controller. Appropriate algorithms apply priorities to various zones and select between various views of the same area to achieve maximum coverage with available resources. The appropriate algorithms will differ in detail for each specific installation but operate with the same principle. Persons with programming skill will be able to generate appropriate control algorithms.

Similarly, there may be more targets than can reasonably be tracked. The network will switch to a default mode when there are no targets or a large number of targets. When in the default mode the cameras cycle through a routine sequence of views or are controlled manually.

The network may also be configured to switch between operating modes according to a threshold of activity. For example, when activity is very low the cameras may be positioned to default views until movement is detected. At a very high level of activity the cameras will also go to default views and manual control. At an intermediate level of activity the cameras will track movement as it is detected by the motion detector.

The invention is not limited to the application of detector rings to dome cameras as described with respect to FIGS. 3-6. The invention may also usefully be applied to track cameras.

Figure 7:
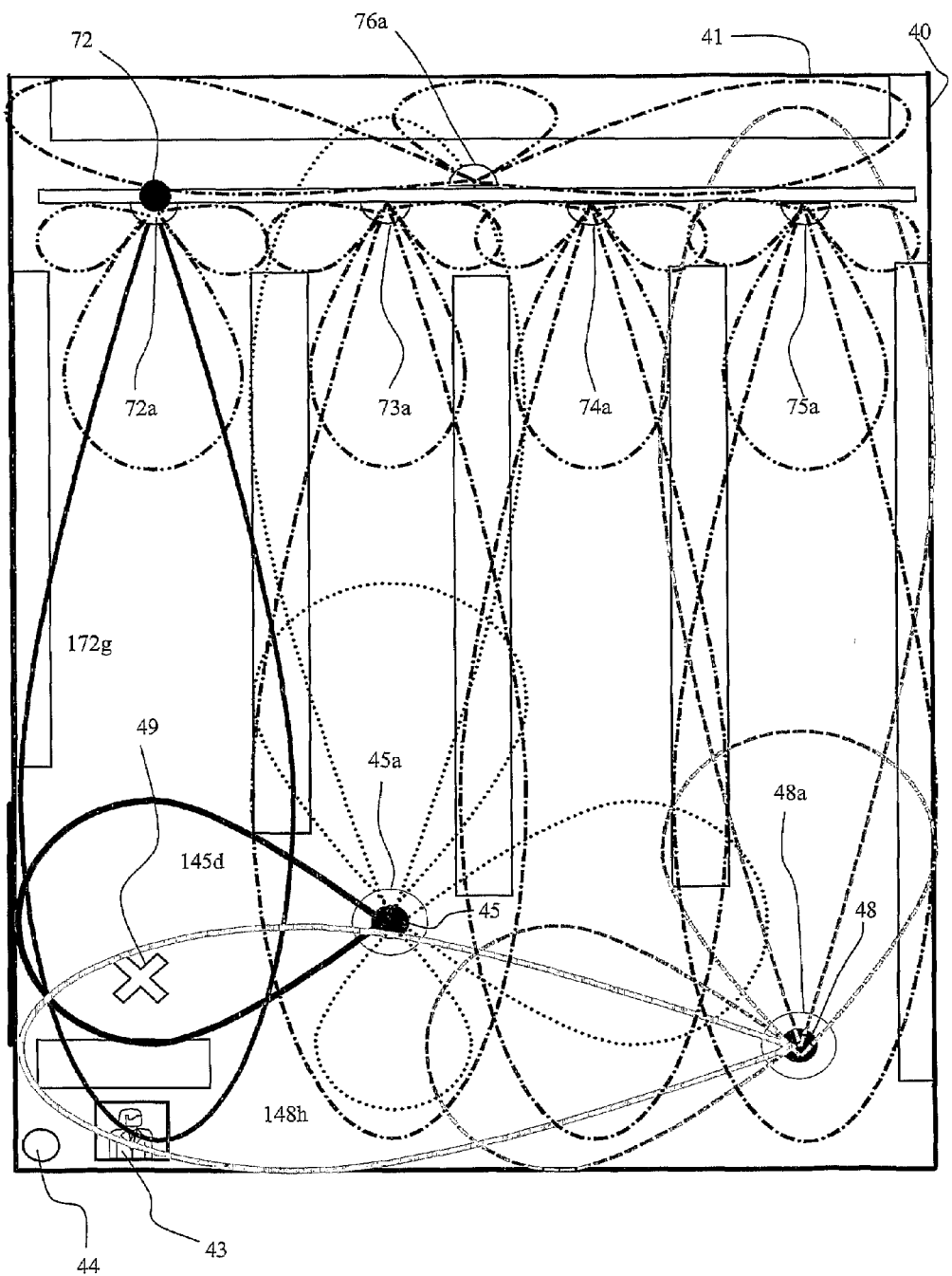
FIG. 7 shows another embodiment of a layout of cameras and detector rings in a grocery store environment.

FIG. 7 shows the same small store of FIGS. 4-6 but with two of the cameras replaced by a track 70 having a single camera that can move along the northern wall. The track 70 has a single camera 71 and four motion detectors 72a-76a. In the example the active detection zones are 145d, 148h and 172g. The camera 45 is controlled in pan, tilt and zoom to view zone 145d, camera 48 is controlled in pan, tilt and zoom to view zone 148h and camera 71 is moved to location 72 and adjusted in pan, tilt and zoom to view zone 172g.

In other respects the track mounted version is similar to the dome cameras described above. A particular advantage of the track system is that fewer cameras are required to achieve the same coverage. Although the specific algorithms for operation are different the principle of operation is as described above.

Figure 8:
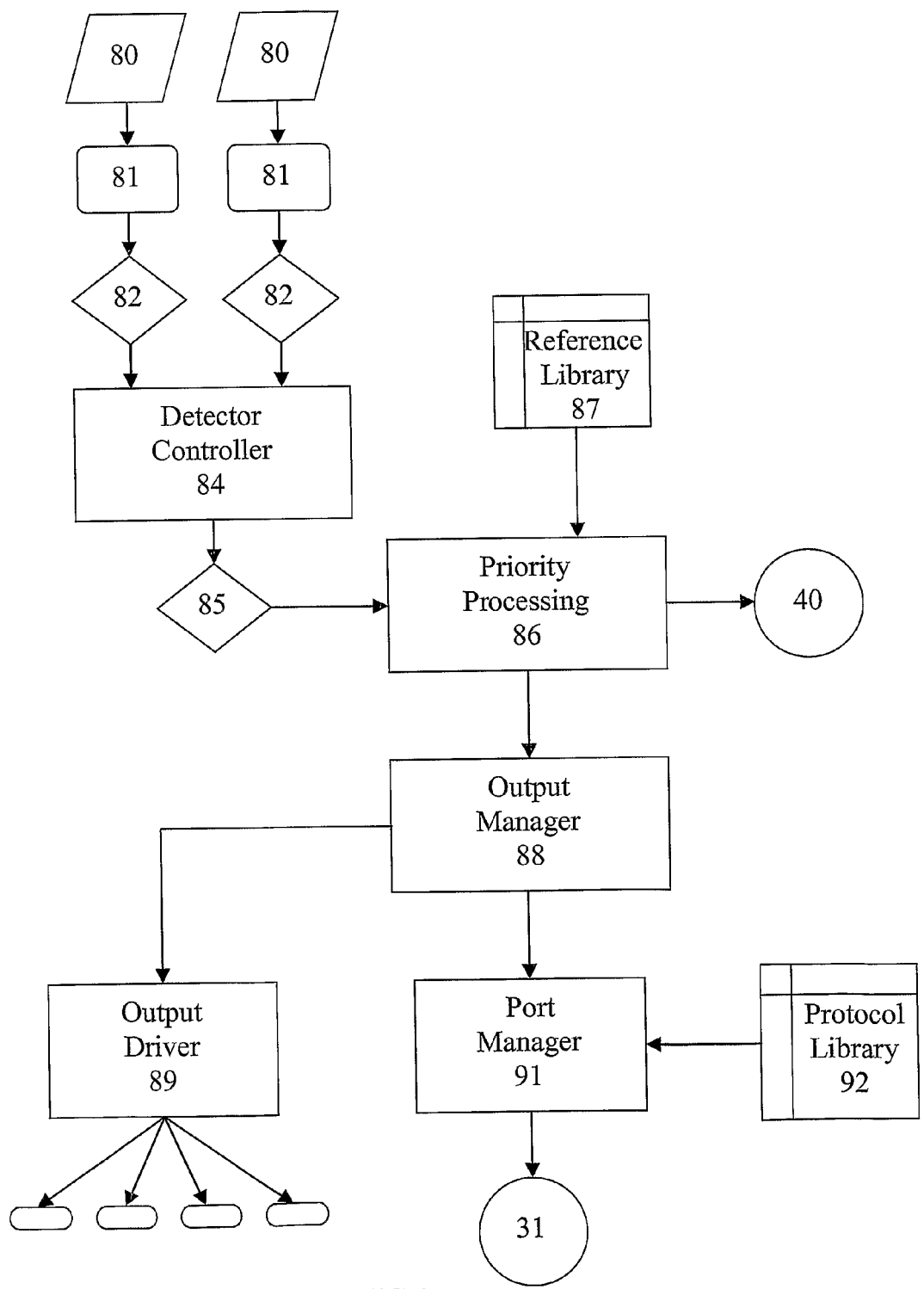
FIG. 8 is a flowchart setting out typical processing steps of the invention.

Referring to FIG. 8, the basic processing steps of a surveillance system incorporating surveillance cameras and motion detectors is shown. Processing is initiated by input detected at the detector elements 80. A sensor manager 81 tests the signal against a preset threshold level. The preset threshold is established at commissioning of the system and determines range and sensitivity of each detector element. Each signal is then checked for validity 82. Many commercially available motion detectors are prone to false alarms. Algorithms are provided to minimize these false alarms by checking the validity of the signal against a range of parameters. Although only two sets of elements 80, 81, 82 are shown it will be appreciated that this may be scaled up as discussed above.

The signals from a number of detector elements are communicated to the detector controller 84. As described above, levels of high and low activity trigger default operating modes. The activity level is monitored 85 according to the zones which are activated and the total level of activity over a given period of time.

Signals from the detector controller 84 are assessed by a priority processing module 86 to handle conflict situations when multiple detector elements of a single detector all detect movement and seek to direct the camera. The priority processing module 86 determines priorities based on a library 87 of preset conditions that are established at commissioning of the surveillance system. The inventors envisage that the library may be updated and modified over time. Signals from the priority processing module 86 may be delivered directly to the detector network 33 if there is a network of detectors as described earlier.

The signals from the priority processing module 86 are also passed to an output manager 88 for direction to the appropriate mode for control of a camera or cameras. One option is that the output manager 88 communicates directly to alarm inputs 90 via an output driver 89. This will be the appropriate mode when there are multiple alarm inputs on the camera. Alternatively, communications will be via some other form of port, such as serial port, and will require a communication protocol conversion module 91. A variety of protocol conversions are suitably stored in a local storage device 92. Communication to the cameras will generally be via the CCTV controller 31.

The invention realizes a number of other surveillance advantages by integration of additional surveillance assets. As described in detail above, the motion detector identifies the location of movement and generates a control signal to direct a camera towards the detected movement to assist an operator to obtain a view of the relevant area. Other directional surveillance assets can also be employed. For instance, an array of directional microphones may be provided and the signal from the motion detector can be used to activate an appropriate microphone. This provides to an operator both video and audio monitoring. It also improves the ability to analyse recorded activity since a person reviewing the recorded activity has the benefit of both audio and video recordings.

Directional microphones may be located with the motion detector and camera assembly shown in FIG. 2 or could be positioned in a separate location but controlled from the output manager 88. When located with the detector and camera assembly the microphones are suitably arranged in a ring around the camera mount in similar manner to the mounting of the detector elements. This configuration has particular advantage since it can be retrofitted to existing camera based surveillance systems.

The motion detector of the invention provides particular advantage by maximizing the effectiveness of pan/tilt/zoom/travel cameras. A camera of any type has a limited angle of view and is blind to any activity outside that angle of view. The invention allows a camera to detect movement throughout a full 360 degree perimeter. The motion detection allows the camera to identify activity, the location of the activity, and to verify the detection through initiation of preset views without the intervention of an operator.

Throughout the specification the aim has been to describe the preferred embodiments of the invention without limiting the invention to any one embodiment or specific collection of features.

The invention claimed is:

1. A motion detector associated with a surveillance camera, the motion detector comprising:
   a plurality of motion detector elements comprising a first plurality of motion detector elements configured to operate at a short range and a second plurality of motion detector elements configured to operate at a long range, the plurality of motion detector elements arranged in a structure associated with the camera, each element of the plurality of motion detector elements having a fixed orientation and a fixed detection zone;
   a detector controller;
   means for communicating an alarm signal from each motion detector element to the detector controller when movement is detected in the detection zone; and
   means for communicating a control signal from the detector controller to the camera in response to receiving the alarm, signal, the control signal causing the camera to do one or more of pan, tilt, zoom and travel to a preset field of view corresponding to the detection zone.

2. The motion detector of claim 1 comprising four short range motion detector elements and four long range motion detector elements.

3. The motion detector of claim 1 wherein the plurality of motion detector elements are selected from infrared detectors, microwave detectors sound detectors or ultrasonic detectors.

4. The motion detector of claim 1 wherein the structure is a ring.

5. The motion detector of claim 1 further comprising a microprocessor which manages one or more of priorities, ranges, directions and communication.

6. The motion detector of claim 1 further comprising a sensor manager that tests alarm signals from each motion detector element against a threshold level.

7. The motion detector Of claim 1 wherein the detector controller comprises a priority processor that handles conflicts between alarm signals from detector elements.

8. The motion detector of claim 1 further comprising a storage device storing communication protocols for converting alarm signals to control signals.

9. A network of multiple motion detectors each associated with one or more cameras wherein detection of movement by at least one of the motion detectors causes one or more of the cameras to do at least one of pan, tilt, zoom and travel to view the movement, each motion detector comprising:
- is plurality of motion detector elements comprising a first plurality of motion detector elements configured to operate at a short range and a second plurality of motion detector elements configured to operate at a long range, the plurality of motion detector elements arranged in a structure associated with a camera, each element of the plurality of motion detector elements having a fixed orientation and a fixed detection zone;
- a detector controller;
- means for communicating an alarm signal from each motion detector element to the detector controller when movement is detected in the detection zone; and
- means for communicating a control signal from the detector controller to the camera, the control signal causing the camera to do the one or more of pan, tilt, zoom and travel to a preset field of view corresponding to the detection zone.

10. The network of multiple motion detectors of claim 9 further comprising a camera controller for manual control of the one or more cameras.

11. The network of multiple motion detectors of claim 9 further comprising a detector network connecting each detector controller of the multiple motion detectors.

12. The network of multiple motion detectors of claim 9 wherein the direction zones are arranged as active zones and non-active zones.

13. The network of multiple motion detectors of claim 12 wherein the active zones are arranged in a priority list.

14. The network of multiple motion detectors of claim 9 further comprising directional microphones associated with each motion detector.

15. A method of detecting motion in an area under surveillance including the steps of:
- monitoring the area with multiple motion detectors associated with one or more cameras, each motion detector comprising a plurality of motion detector elements comprising a first plurality of motion detector elements configured to operate at a short range and a second plurality of motion detector elements configured to operate at a long range the plurality of motion detector elements arranged in a structure associated with a camera and providing an alarm signal when movement is detected, and a detector controller, each motion detector element of the plurality of motion detector elements having a fixed orientation and a fixed detection zone;
- receiving an alarm signal from at least one detector element at a detector controller;
- sending control signals from the detector controller to at least one of the one or more cameras to cause the camera to do at least one of pan, tilt, zoom and travel to a preset field of view corresponding to the movement.

16. The method of claim 15 further including the step of testing each alarm signal against a threshold.

17. The method of claim 15 wherein a detector controller receives multiple alarm signals and further including the step of the detector controller assessing a priority of each alarm signal.

18. The method of claim 15 wherein multiple detector controllers receive alarm signals and further including the step of a network controller assessing a priority for each alarm signal.

* * * * *